3,711,418
RARE EARTH OXIDE PHOSPHORS

James E. Mathers and Ramon L. Yale, Ulster, Pa., assignors to GTE Sylvania Incorporated, Seneca Falls, N.Y.
No Drawing. Filed Nov. 13, 1970, Ser. No. 89,452
Int. Cl. C09k 1/10
U.S. Cl. 252—301.4 R
6 Claims

ABSTRACT OF THE DISCLOSURE

A cathodoluminescent phosphor composition, with a controlled decay time, is disclosed wherein the phosphor consists of a matrix of $Y_2O_3$ and a dopant of europium and a predetermined amount of dysprosium. A process for controlling the decay time is also disclosed.

CROSS REFERENCE TO RELATED APPLICATION

Co-pending U.S. patent application S.N. 89,473, filed concurrrently herewith, discloses a luminescent phosphor composition consisting of a yttrium oxide matrix and a dopant of europium and up to about 110 p.p.m. of at least one of praseodymium and terbium and a process for preparing such a phosphor. The foregoing co-pending patent application is assigned to the same assignee as the present invention.

BACKGROUND OF THE INVENTION

Field of the invention

This invention relates to a phosphor composition. More particularly, it relates to a yttrium oxide phosphor with a controlled decay time.

Prior art

With the advent of color television, a whole new series of phosphors was necessary. Zinc cadmium sulfide was the red-emitting phosphor that was generally used. However, because of its high cadmium content, the phosphor has an objectionable yellow-orange body color, which imparts a noticeable yellowish off-white appearance to the screen as a whole. Another short-coming of the red-emitting zinc cadmium sulfide phosphor is its insufficient luminous efficiency relative to the green-emitting and blue-emitting phosphors. This made the red-emitting phosphor the limiting factor in developing a color screen combination of desired brightness.

With the discovery of the rare-earth phosphor systems, especially europium-activated yttrium oxide, the previous problems; that is, body color and brightness, were overcome. Much has appeared in the literature and issued patents concerning the rare-earth phosphor systems. Ropp recites $Y_2O_3$ phosphors activated by samarium, europium, gadolinium, terbium, and dysprosium, respectively, with europium-activated $Y_2O_3$ being the superior phosphor. Wickersheim and Lefever avoid using yttrium oxide containing dysprosium because they state it reduces the fluorescent intensity. Thompson in U.S. Pat. 3,322,612 uses various combinations of europium, gadolinium, praseodymium, cerium and neodymium as activators with a $Y_2O_3$ matrix to prepare phosphors having a brilliant luminescence when exhibited under cathode-ray excitation.

Most of the literature is concerned with improving the brightness of the phosphor systems. Very little is reported concerning other problems that are evident in the rare-earth phosphor systems. One of the properties that can be a problem is the decay time of these phosphors. The decay time of the rare-earth phosphors is extremely short, which in most cases is a very desirable quality. However, there are times when it is advantageous to be able to control the decay time of the rare-earth phosphors, especially $Y_2O_3$:Eu, to make them more compatible with special green-emitting and blue-emitting phosphors used for single gun tubes. In these cases, the green-emitting phosphor, usually zinc silicate, has a somewhat longer decay time than the standard green-emitting phosphor, usually a zinc cadmium sulfide; and a red-emitting phosphor, $Y_2O_3$:Eu, that has a controlled decay time to give a more overall uniform quality picture would be advantageous.

It is believed, therefore, that a red-emitting cathodoluminescent phosphor consisting of a yttrium oxide matrix and a dopant of europium and very carefully controlled amounts of dysprosium, and one whose decay time can be controlled without having adverse effects on the physical and chemical properties of the phosphor, especially brightness, is an advancement in the art.

Summary of the invention

In accordance with one aspect of this invention, there is provided a cathodoluminescent phosphor composition. The phosphor composition consists essentially of a yttrium oxide matrix and a dopant consisting of from about 1 to about 10 weight percent europium and from about 1 to about 100 p.p.m. dysprosium.

In accordance with another aspect of this invention, there is provided a process for preparing the cathodoluminescent phosphor composition. The process comprises adding from about 1 to about 100 p.p.m. dysprosium to the phosphor raw materials prior to firing the raw materials to form the phosphor.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

Referring now to the invention with greater particularity, it has been found that when up to about 100 p.p.m. dysprosium is added to yttrium oxide phosphor raw materials prior to firing the raw materials the decay time of the resultant phosphor can be controlled and lengthened without appreciably affecting the brightness of the phosphor.

The cathodoluminescent phosphor composition consists of a matrix of about 90 to about 99% weight percent yttrium oxide and a dopant of about 1 to about 10 weight percent europium and about 1 to about 100 p.p.m. dysprosium. Preferably, the source of the yttrium oxide is at least 99.9% pure. Especially preferred is about 95 to about 96 weight percent yttrium oxide and about 5 to about 4 weight percent europium oxide to insure the maximum color purity and brightness. When less than about 90 weight percent yttrium oxide is used, the excessive amounts of europium present can cause a quenching effect and a significant loss in brightness. When greater than about 99% yttrium oxide is used, generally not enough europium is present to activate the phosphor. The effect of decay time of the phosphor is directly proportional to the amount of dysprosium added. As little as about 1 p.p.m. can increase the decay time as much as 20 percent. The presence of greater than about 100 p.p.m. dysprosium can have an adverse effect on the brightness of the phosphor, and as a result are generally avoided.

Compositions especially preferred are those which have dopants consisting of from about 1 to about 10 weight percent europium and about 1 p.p.m., 10 p.p.m., and 50 p.p.m. dysprosium respectively. These compositions offer a wide range of controlled decay time with generally little or no effect on the brightness of the phosphor.

The method of incorporating dysprosium into the $Y_2O_3$:Eu lattice is accomplished by having dysprosium present in the phosphor raw mtaerials and the subsequent conversion of the phosphor raw materials to the desired phosphor. This can be accomplished by coprecipitating yttrium, europium, and dysprosium as oxalates, separating the oxalates, such as by filtration, and firing the oxalates under controlled conditions to form the desired phosphor. Another such method is to combine yttrium oxide, europium oxide, and dysprosium oxide and to convert the raw materials to the desired phosphor by the direct firing of the oxides at temperatures of from about 1100° C. to about 1300° C. for at least about 2 hours. Firing the raw materials for about 2 hours to about 6 hours within the aforementioned temperature range is necessary to insure complete conversion of the oxides to the phosphor.

In order to more fully illustrate the preferred embodiments of this invention, the following detailed examples are given. All parts, proportions and percentages are by weight unless otherwise given.

EXAMPLE 1

In order to evaluate this invention for controlling the decay time of $Y_2O_3$:Eu phosphor, a testing procedure is devised to simulate the phenomenon as it actually occurs in a display panel or cathode-ray tube. The method of measuring $Y_2O_3$:Eu decay is a semiquantitative technique using a demountable cathode-ray tube with a control grid pulsed by a pulse generator. Buildup and decay of fluorescence are detected by an RCA No. 6217 photomultiplier with its output connected to an oscilloscope.

Settled slides of the phosphor samples are mounted in a rotating holder inside the CRT. This enables each sample to be subjected to the same excitation conditions without making any adjustments on the electron gun or yoke. A defocussed spot is pulsed on the screen at a current density of approximately 0.5 microamps/cm.². At low photomultiplier sensitivity, the pulse length is adjusted to give 100% buildup (i.e., the curve flattens out at the top). The sensitivity is then increased so that a reference standard reaches a predetermined level (0.5 volt in our case) at 30 milliseconds after cessation of excitation. The samples are then rotated in front of the electron beam without making any gun or photomultiplier adjustments and the relative readings are taken at 30 milliseconds. This procedure is carried out for all the examples.

About 214.5 parts $Y_2O_3$, about 17.6 parts $Eu_2O_3$ and about 0.0232 part $Dy_2O_3$ are dissolved in a minimum amount of nitric acid and then coprecipitated as a mixed yttrium-europium-dysprosium oxalate that is separated by filtration, dried, and heat treated at about 1200° C. for about 2 hours.

The resultant phosphor has an increased decay time ten times greater than a similar phosphor prepared without the dysprosium addition as determined using the beforementioned oscilloscope method.

EXAMPLE 2

$Y_2O_3$:Eu phosphors are prepared according to the procedure in Example 1, but the amount of dysprosium added varied from about 0 (standard) to about 100 p.p.m. The decay time and brightness in relation to the amount of dysprosium added are given in Table I.

TABLE I

| Phosphor | Dysprosium added, p.p.m. | Decay to 30 ms., v. | CRT brightness |
| --- | --- | --- | --- |
| $Y_2O_3$:Eu | 0 | .050 | 99 |
|  | 1 | .070 | 100 |
|  | 5 | .200 | 95 |
|  | 10 | .320 | 97 |
|  | 15 | .400 | 96 |
|  | 25 | .500 | 96 |
|  | 50 | .680 | 98 |
|  | 75 | .800 | 95 |
|  | 100 | .900 | 94 |

The decay of the $Y_2O_3$:Eu phosphor can be controlled by the addition of dysprosium and still have the relatively same brightness level of the standard.

While there has been shown and described what are at present considered the preferred embodiments of the invention, it will be obvious to those skilled in the art that various changes and modifications may be made therein without departing from the scope of the invention as defined by the appended claims.

What is claimed is:

1. A cathodoluminescent phosphor composition having a controlled decay time consisting essentially of:
   (a) a matrix consisting of yttrium oxide, and
   (b) a dopant consisting of from about 1 to about 10 weight percent europium and from about 1 p.p.m. to about 10 p.p.m. dysprosium.

2. A composition according to claim 1, wherein said dopant consists of from about 1 to about 10 weight percent europium and about 10 p.p.m. dysprosium.

3. A composition according to claim 1, wherein said dopant consists of from about 1 to about 10 weight percent europium and about 1 p.p.m. dysprosium.

4. A process for controlling the decay time of a cathodoluminescent europium-activated yttrium oxide phosphors which comprises adding from about 1 p.p.m. to about 10 p.p.m. dysprosium to the phosphor raw materials prior to firing said raw materials to form said phosphor.

5. A process according to claim 4, wherein said yttrium oxide, europium oxide, and dysprosium oxide are coprecipitated as oxalates prior to firing said materials to form said phosphors.

6. A process according to claim 4, wherein said yttrium oxide, europium oxide, and dysprosium oxide are converted to said phosphor by direct firing of said oxides at a temperature range of from about 1100° C. to about 1300° C. for at least about 2 hours.

References Cited

UNITED STATES PATENTS 3,322,682   5/1967   Thompson _____ 252—301.4 R

ROBERT D. EDMONDS, Primary Examiner